(12) United States Patent
Eo et al.

(10) Patent No.: US 12,437,268 B2
(45) Date of Patent: Oct. 7, 2025

(54) CONTACT-FREE REMOTE WORK PROCESSING SYSTEM AND METHOD THROUGH USER INTERFACE SHARING

(71) Applicant: INSWAVE SYSTEMS CO., LTD., Seoul (KR)

(72) Inventors: Se Yong Eo, Seoul (KR); Woog Lae Kim, Seoul (KR)

(73) Assignee: INSWAVE SYSTEMS CO., LTD., Seoul (KR)

( * ) Notice: Subject to any disclaimer, the term of this patent is extended or adjusted under 35 U.S.C. 154(b) by 0 days.

(21) Appl. No.: 18/858,727

(22) PCT Filed: Apr. 17, 2023

(86) PCT No.: PCT/KR2023/005156
§ 371 (c)(1),
(2) Date: Oct. 21, 2024

(87) PCT Pub. No.: WO2023/204544
PCT Pub. Date: Oct. 26, 2023

(65) Prior Publication Data
US 2025/0111339 A1    Apr. 3, 2025

(30) Foreign Application Priority Data
Apr. 23, 2022 (KR) .................. 10-2022-0050455

(51) Int. Cl.
*G06Q 10/06* (2023.01)
*G06F 3/14* (2006.01)
(Continued)

(52) U.S. Cl.
CPC ......... *G06Q 10/103* (2013.01); *G06F 3/1454* (2013.01); *G06F 16/71* (2019.01)

(58) Field of Classification Search
CPC ...... G06Q 10/103; G06F 3/1454; G06F 16/71
(Continued)

(56) References Cited

U.S. PATENT DOCUMENTS 5,872,924 A * 2/1999 Nakayama ............ G06F 3/1454
                                                          709/227
9,479,548 B2 * 10/2016 Jensen .................. H04L 65/403
(Continued)

FOREIGN PATENT DOCUMENTS

EP           3706027 A1 *   9/2020   ........... G06F 17/242

OTHER PUBLICATIONS

Office Action for Korean Patent Application No. 10-2022-0050455 issued by the Korean Patent Office on Jan. 2, 2024.
(Continued)

*Primary Examiner* — Jonathan P Ouellette
(74) *Attorney, Agent, or Firm* — IP & T GROUP LLP

(57) ABSTRACT

Disclosed is a contact-free remote work processing system and method through user interface sharing. A contact-free remote work processing system through user interface sharing, according to one embodiment of the present invention, comprises: a first user terminal in which a service application is installed and executed; a second user terminal which shares and displays a user interface according to execution of the service application; and a work support server which communicates with the first user terminal and the second user terminal, and sets the user interface of the first user terminal to be shareable with the second user terminal under specified conditions so as to enable contact-free remote work processing, wherein at least one of the first user terminal and the second user terminal may comprise a user interface sharing module which performs history logging about user interface sharing.

7 Claims, 11 Drawing Sheets

Figure 1:
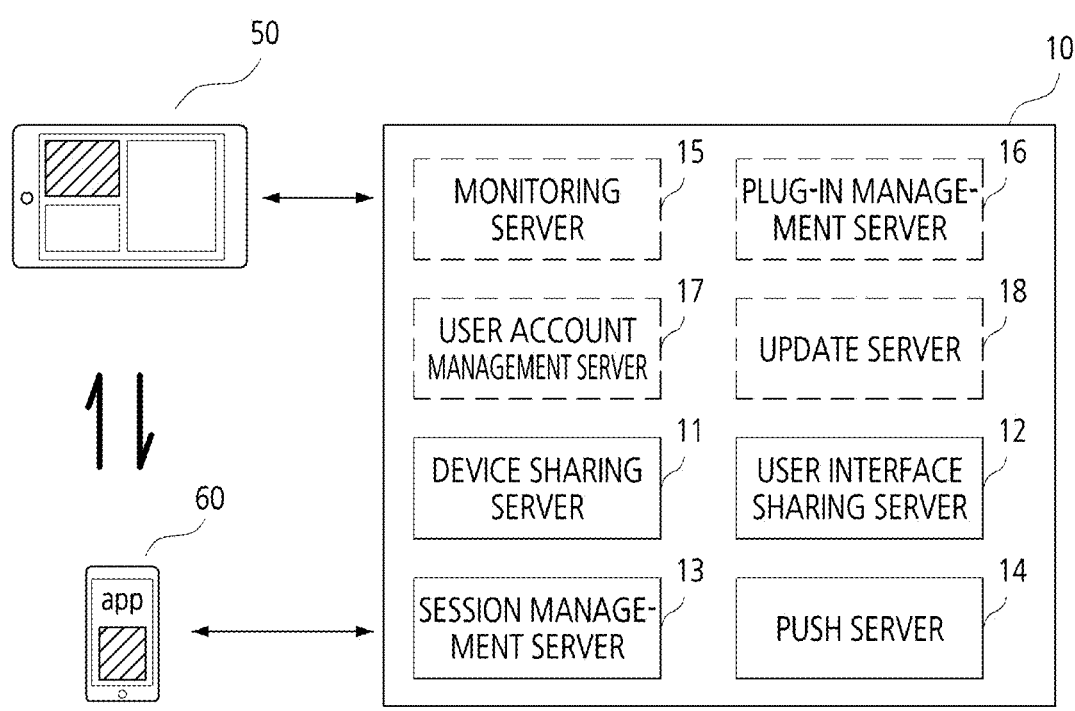

(51) Int. Cl.
*G06F 8/20* (2018.01)
*G06F 16/71* (2019.01)
*G06Q 10/10* (2023.01)

(58) Field of Classification Search
USPC .................................................. 705/1.1–912
See application file for complete search history.

(56) References Cited

U.S. PATENT DOCUMENTS

| | | | |
|---|---|---|---|
| 10,156,900 B2* | 12/2018 | Publicover | G06F 3/012 |
| 11,212,127 B2* | 12/2021 | Chanda | H04L 65/4015 |
| 11,727,643 B1* | 8/2023 | Bhushan | H04L 65/80 |
| | | | 345/420 |
| 11,757,958 B1* | 9/2023 | Lubbehusen | H04L 67/02 |
| | | | 709/224 |
| 12,106,075 B2* | 10/2024 | Bodin | G06F 11/3438 |
| 2012/0075212 A1* | 3/2012 | Park | G06F 3/04886 |
| | | | 345/173 |
| 2012/0278738 A1* | 11/2012 | Kruse | G06Q 10/10 |
| | | | 715/756 |
| 2014/0289872 A1* | 9/2014 | Mun | G06F 21/6245 |
| | | | 726/30 |
| 2018/0084418 A1* | 3/2018 | Walsh | H04W 12/041 |
| 2024/0073368 A1* | 2/2024 | Malan | H04N 7/155 |
| 2024/0348842 A1* | 10/2024 | Davoodi | H04N 21/26613 |

OTHER PUBLICATIONS

International Search Report for International Patent Application No. PCT/KR2023/005156 issued by the International Searching Authority on Jul. 25, 2023.

* cited by examiner

STORING LOGGING DATA

CONTACT-FREE REMOTE WORK PROCESSING SYSTEM AND METHOD THROUGH USER INTERFACE SHARING

This application is a national stage application of PCT/KR2023/005156 filed on Apr. 17, 2023, which claims priority of Korean patent application number 10-2022-0050455 filed on Apr. 23, 2022. The disclosure of each of the foregoing applications is incorporated herein by reference in its entirety.

FIELD OF THE INVENTION

The present invention relates to a work processing system and method, and more specifically, to a non-face-to-face remote work processing system and method that enables efficient performance of work remotely in a non-face-to-face manner through sharing of a user interface.

BACKGROUND

Digital transformation has been in the spotlight recently. Digital transformation means that our lives and business works are being converted to digital using new digital technologies.

Companies/organizations are changing to using the cloud to provide services without having to configure their own servers or operating environments. Using a cloud service means that data or resources exist on an external cloud.

This is bringing about a change to a new work environment of diverse collaboration and sharing through mobile devices such as smartphones, and the need for work programs capable of supporting collaboration and sharing is rapidly increasing to adapt to this.

Currently, the market is divided into platforms for mobile app development and desktop application platforms. In the mobile ecosystem, with the emergence of incompatible mobile operating systems such as Apple's iOS and Google's Android, the burden of developing separate applications for specific operating systems has increased, and hybrid apps, which can efficiently and easily create a single app that can run on multiple platforms such as IOS, Android, and Windows with a single development effort, have begun to attract attention.

In addition, as non-face-to-face remote services increase in the post-pandemic era, work processes suitable for this are required.

Korean Patent Publication No. 10-2012-0063366 discloses a work support system.

SUMMARY

Technical Objectives

The present invention is intended to provide a system and method for non-face-to-face remote work processing through user interface sharing that enables non-face-to-face remote work processing by sharing all user interface blocks implemented on the web between a service user and a provider, thereby improving work efficiency.

Other objectives of the present invention will be readily understood through the following description.

Technical Solutions

According to one aspect of the present invention, there is provided a system for non-face-to-face remote work processing through user interface sharing, including a first user terminal on which a service application is installed and executed, a second user terminal configured for sharing and displaying a user interface in accordance with execution of the service application, and a work support server, in communication with the first user terminal and the second user terminal, and configured for, under specified conditions, facilitating the user interface of the first user terminal to be shared with the second user terminal to enable remote and non-face-to-face work processing, wherein at least one of the first user terminal and the second user terminal includes a user interface sharing module configured for performing a history logging regarding user interface sharing.

In one embodiment, the user interface sharing module may be configured for recording a history relating to sharing processing information between the first user terminal and the second user terminal over a period of time, so that the history is stored in a database.

In one embodiment, the sharing processing information may be a combination of occurrence events regarding the shared screen and user actions.

In one embodiment, the occurrence event may include at least one of click, mouse movement, input, signature, and annotation processing.

In one embodiment, the user interface sharing module may provide a replay function that, upon request, is configured for reading the history stored in the database to display the shared screen and replaying the events that occurred.

In one embodiment, the user interface sharing module may be configured for activating a front camera installed on the terminal during the history logging, so that a captured image data and a capture time information of a sharing user or a viewer user are attached to the history record as authentication materials and kept together.

Alternatively, in one embodiment, the user interface sharing module may be configured for activating a microphone installed on the terminal during history logging to record a voice of a shared user or a viewer user and attach voice data to the history record as an authentication material and kept together.

In one embodiment, the work support server may be configured for generating a token corresponding to a token generation request for user interface sharing from one of the first user terminal and the second user terminal and transmitting the token to the requesting terminal, and determining whether the token included in a sharing request from the other of the first user terminal and the second user terminal is the same as the token sent to either of the first user terminal and the second user terminal to determine whether the sharing is authorized.

In one embodiment, at least one of the first user terminal and the second user terminal may be configured for generating and displaying on a screen an identification code having the token and access information to the work support server, and the other of the first user terminal and the second user terminal is configured for generating the sharing request using data captured by the identification code.

According to one aspect of the present invention, there is provided a method for non-face-to-face remote work processing through user interface sharing, including initiating a user interface sharing between a first user terminal and a second user terminal, logging a history of a shared screen and occurrence events when a predetermined condition is met, storing a history record in a database, and in response to a replay request for the history record, retrieving the history record from the database to display the shared screen and reproduce the occurrence event sequentially.

In one embodiment, in the logging a history, a front camera installed on the terminal may be activated during the history logging, so that a captured image data and a capture time information of a sharing user or a viewer user are attached to the history record as authentication materials and kept together.

In one embodiment, in the logging a history, a microphone installed on the terminal may be activated during history logging to record a voice of a shared user or a viewer user and attach voice data is attached to the history record as an authentication material and kept together.

Other aspects, features and advantages other than those described above will become apparent from the following drawings, claims and detailed description of the invention.

Effects of Invention

According to embodiments of the present invention, all user interface blocks implemented on the web are shared between the service user and the provider, enabling non-face-to-face remote work processing, which has the effect of improving work efficiency.

BRIEF DESCRIPTION OF ACCOMPANYING DRAWINGS

Figure 2:
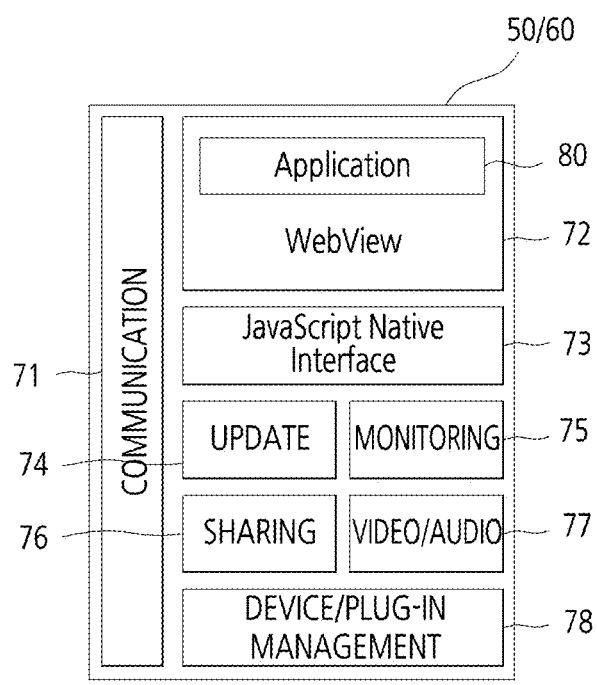
Figure 3:
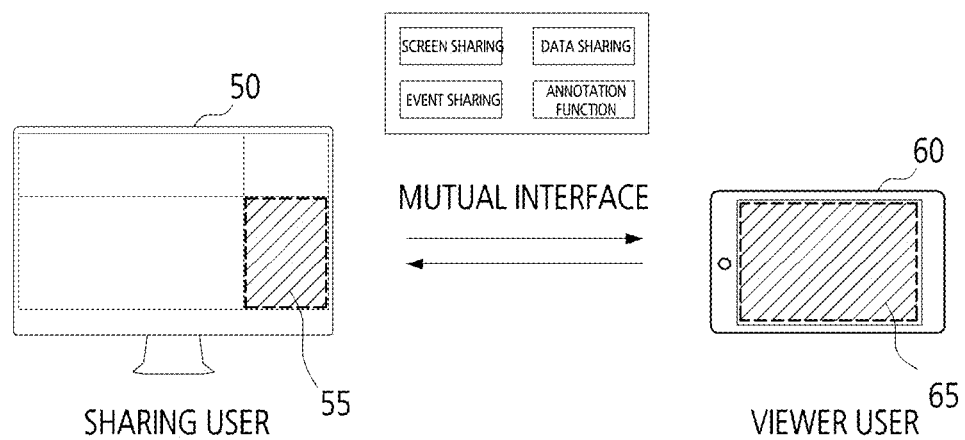
Figure 4:
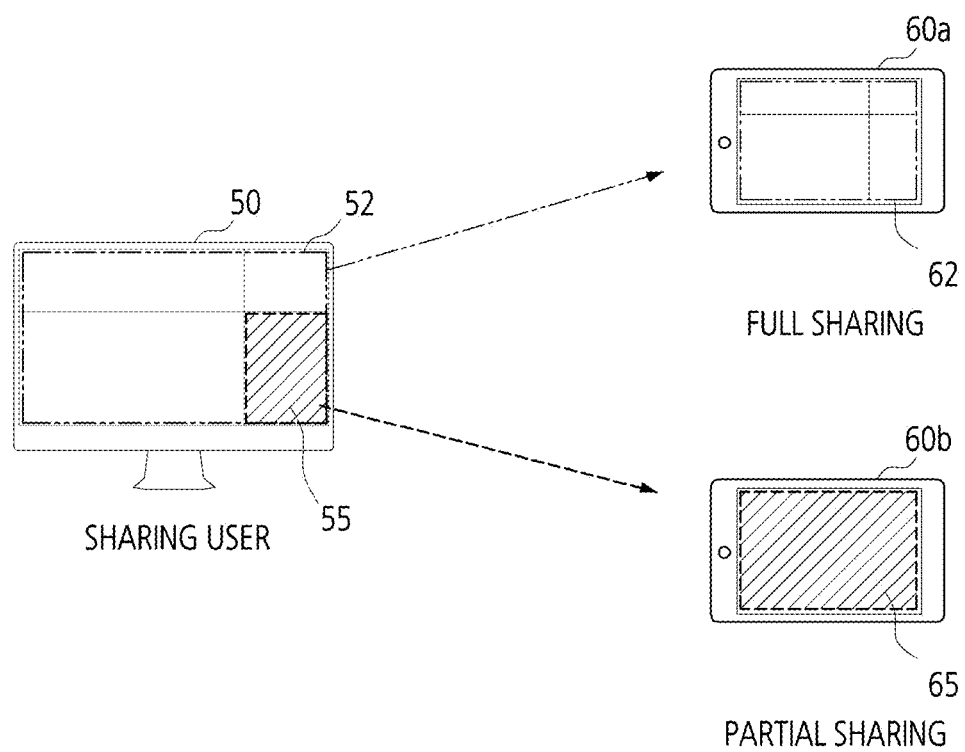
Figure 5:
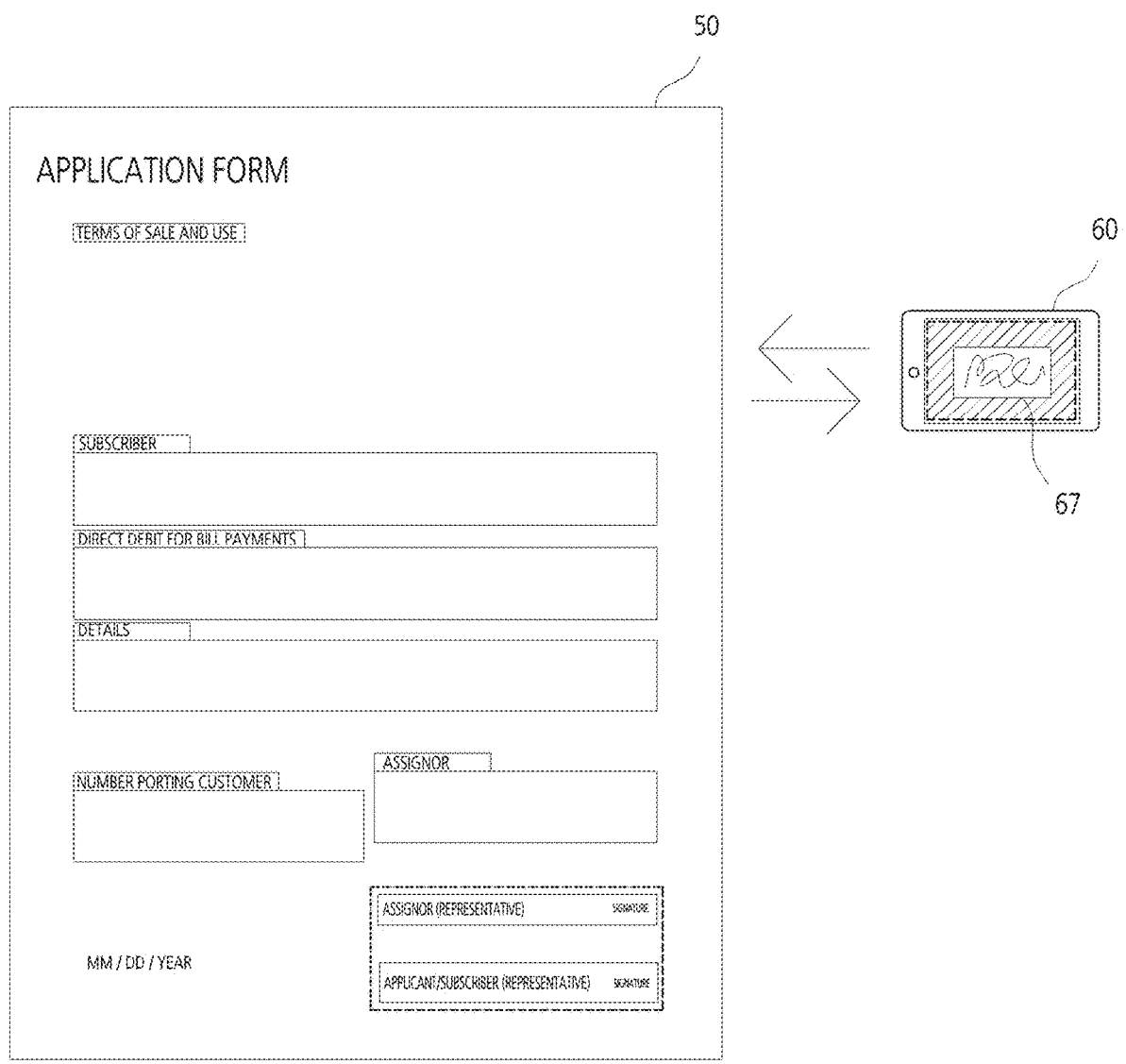
Figure 6:
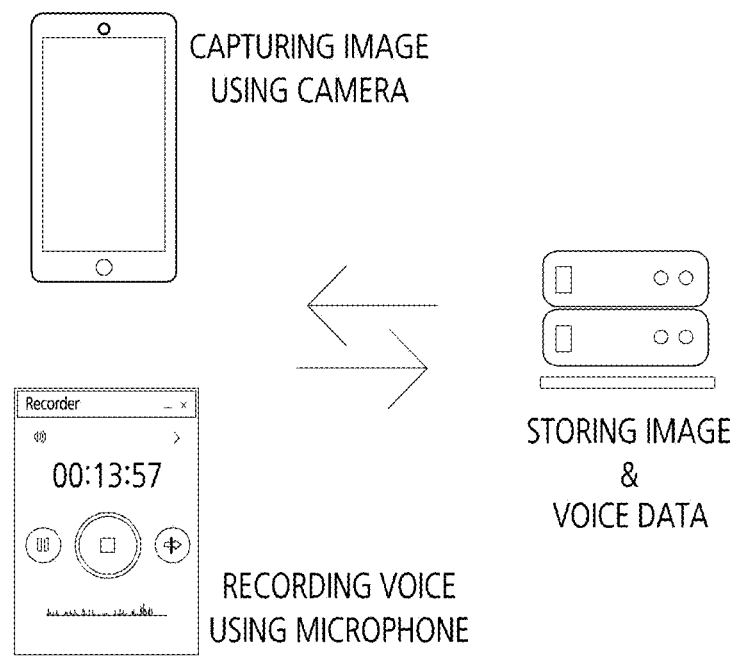
Figure 7:
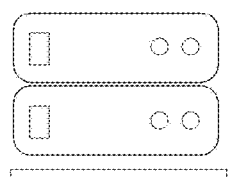
Figure 8:
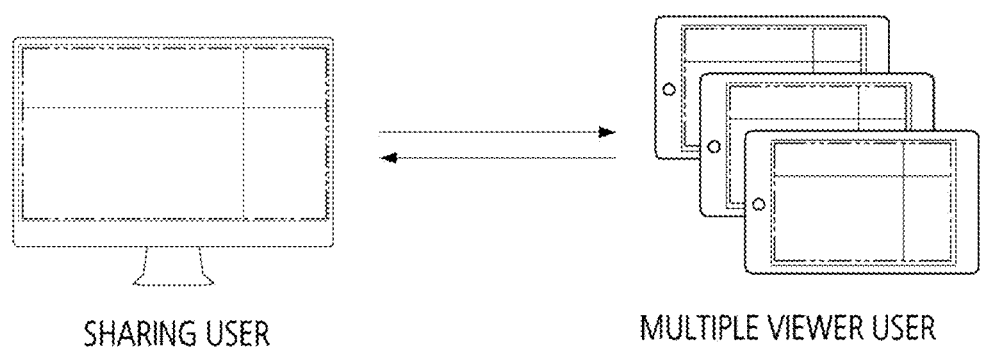
Figure 9:
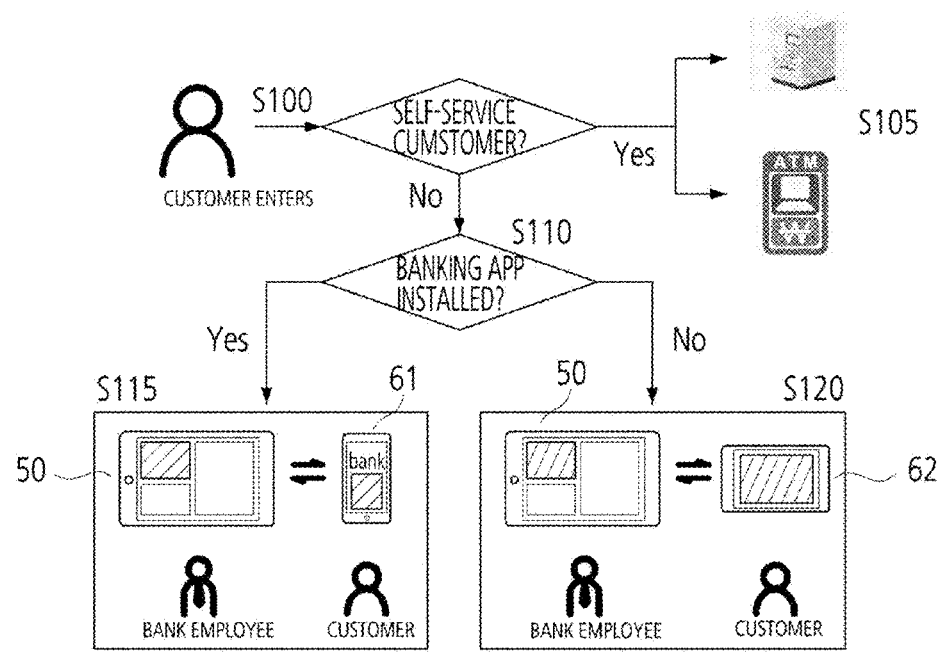
Figure 10:
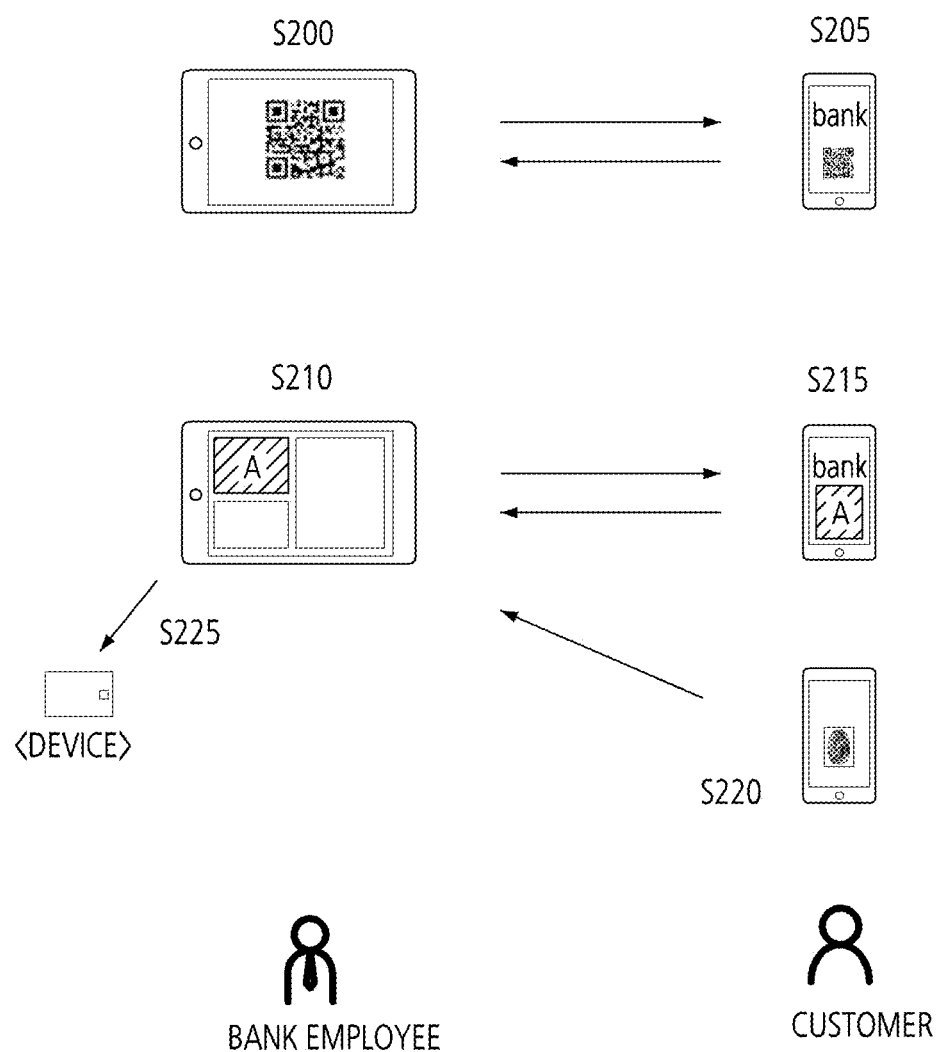
Figure 11:
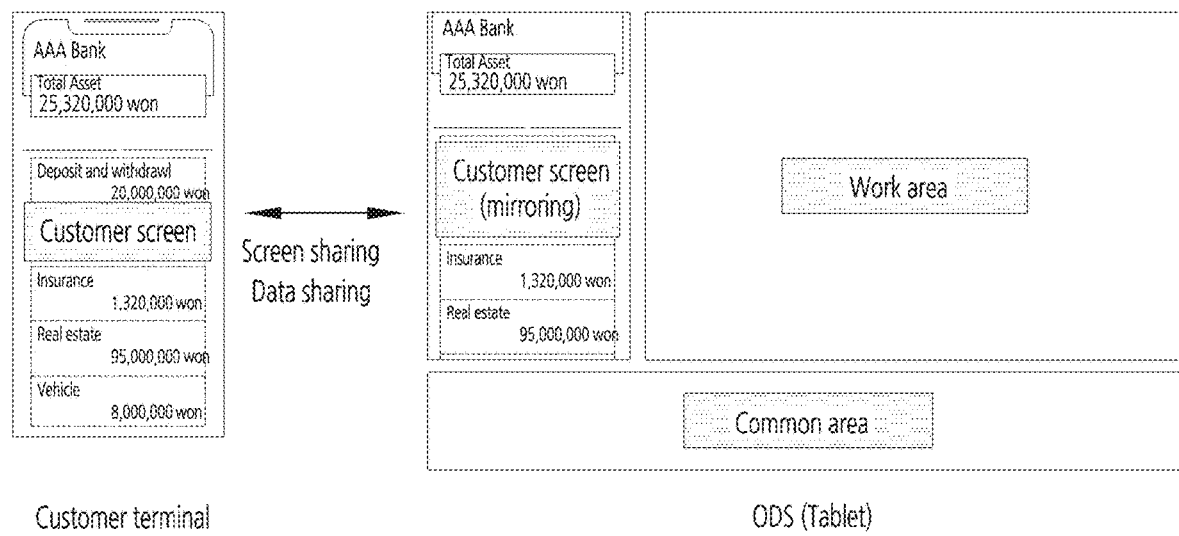
Figure 12:
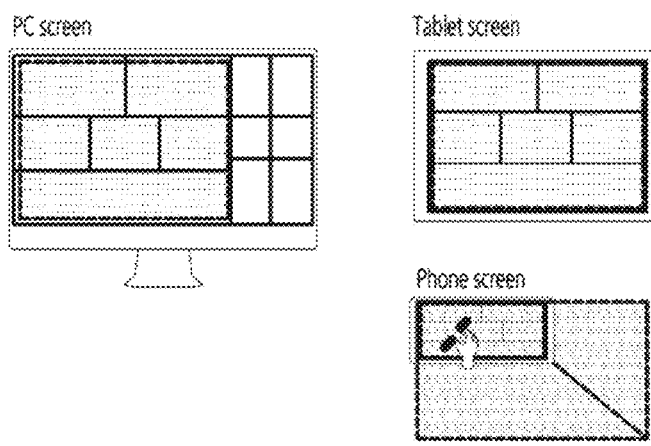
Figure 13:
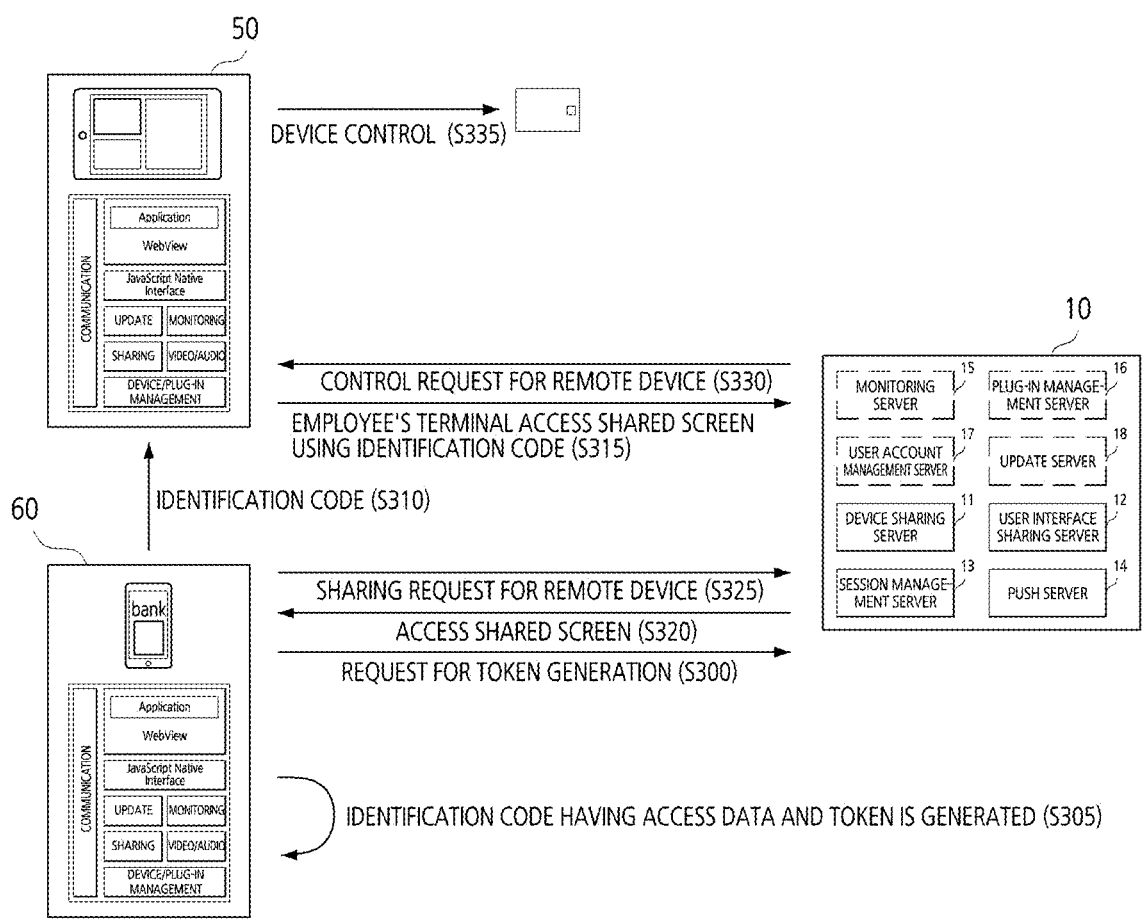
Figure 14:
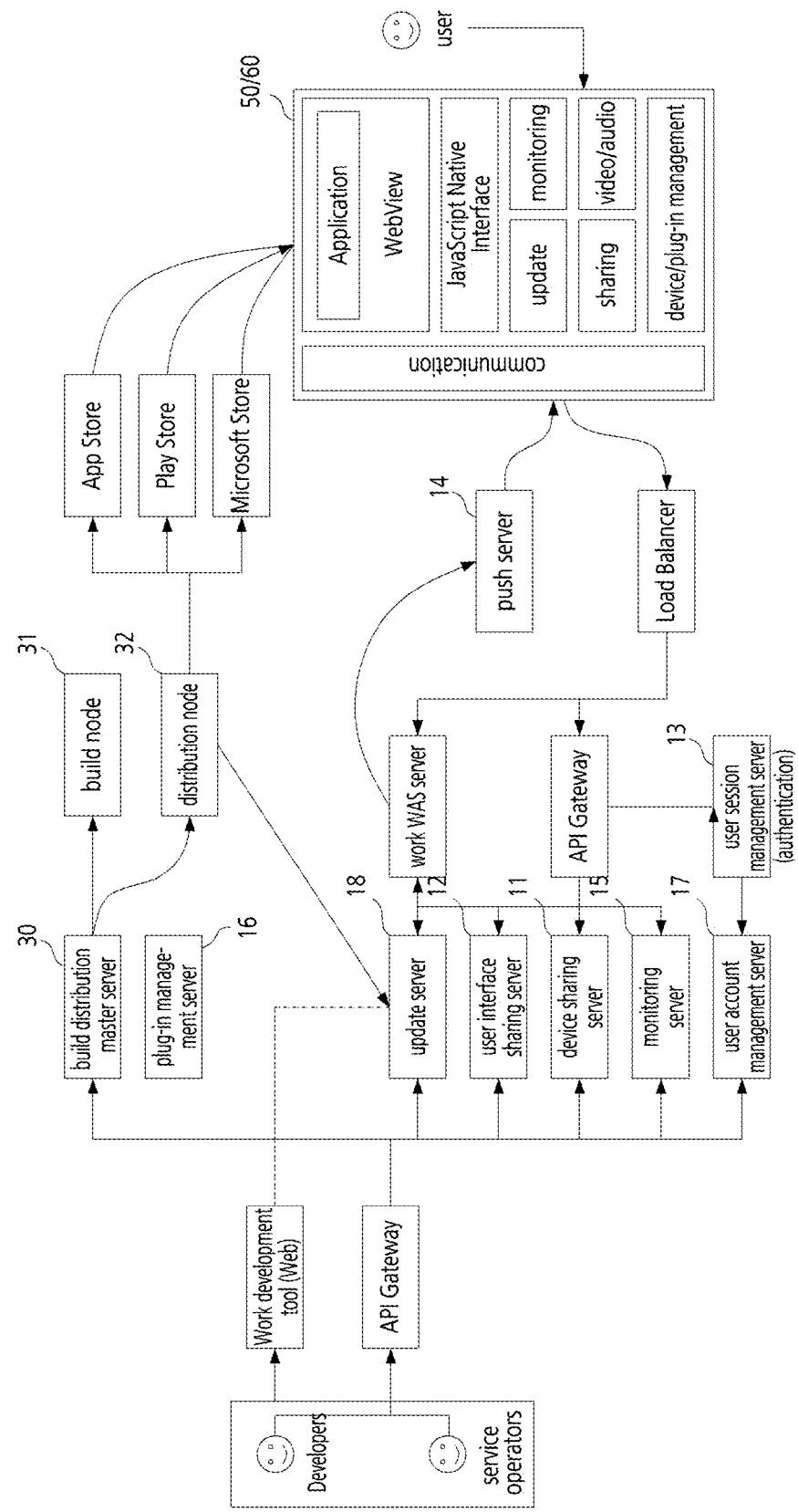

FIG. 1 exemplarily illustrates a non-face-to-face remote work processing system through user interface sharing according to one embodiment of the present invention;

FIG. 2 is a block diagram of client-side (sharing user terminal, viewer user terminal) components included in the non-face-to-face remote work processing system through user interface sharing according to one embodiment of the present invention;

FIG. 3 exemplarily illustrates the non-face-to-face remote work processing system through user interface sharing according to one embodiment of the present invention;

FIG. 4 exemplarily illustrates full sharing and partial sharing;

FIG. 5 exemplarily illustrates signature data sharing;

FIG. 6 exemplarily illustrates image and voice data sharing;

FIG. 7 exemplarily illustrates history logging and replay function;

FIG. 8 exemplarily illustrates multiple sharing;

FIG. 9 and FIG. 10 exemplarily illustrate a work support process through screen sharing according to one embodiment of the present invention;

FIG. 11 exemplarily illustrates a work screen sharing between a customer terminal and an employee terminal;

FIG. 12 exemplarily illustrates a screen view;

FIG. 13 exemplarily illustrates a user interface sharing process for non-face-to-face remote work processing; and FIG. 14 exemplarily illustrates an architecture of a multi-platform application development system according to one embodiment of the present invention.

DETAILED DESCRIPTION

The invention can be modified in various forms and specific embodiments will be described below and illustrated with accompanying drawings. However, the embodiments are not intended to limit the invention, but it should be understood that the invention includes all modifications, equivalents, and replacements belonging to the concept and the technical scope of the invention.

If it is mentioned that an element is "connected to" or "coupled to" another element, it should be understood that still another element may be interposed therebetween, as well as that the element may be connected or coupled directly to another element. On the contrary, if it is mentioned that an element is "connected directly to" or "coupled directly to" another element, it should be understood that still another element is not interposed therebetween.

Terms such as first, second, etc., may be used to refer to various elements, but, these element should not be limited due to these terms. These terms will be used to distinguish one element from another element.

The terms used in the following description are intended to merely describe specific embodiments, but not intended to limit the invention. An expression of the singular number includes an expression of the plural number, so long as it is clearly read differently. The terms such as "include" and "have" are intended to indicate that features, numbers, steps, operations, elements, components, or combinations thereof used in the following description exist and it should thus be understood that the possibility of existence or addition of one or more other different features, numbers, steps, operations, elements, components, or combinations thereof is not excluded.

Elements of an embodiment described below with reference to the accompanying drawings are not limited to the corresponding embodiment, may be included in another embodiment without departing from the technical spirit of the invention. Although particular description is not made, plural embodiments may be embodied as one embodiment.

In describing the invention with reference to the accompanying drawings, like elements are referenced by like reference numerals or signs regardless of the drawing numbers and description thereof is not repeated. If it is determined that detailed description of known techniques involved in the invention makes the gist of the invention obscure, the detailed description thereof will not be made.

Terms such as ~ part, ~ unit, ~ module mean an element configured for performing a function or an operation. This can be implemented in hardware, software or combination thereof.

FIG. 1 exemplarily illustrates a non-face-to-face remote work processing system through user interface sharing according to one embodiment of the present invention, FIG. 2 is a block diagram of client-side (sharing user terminal, viewer user terminal) components included in the non-face-to-face remote work processing system through user interface sharing according to one embodiment of the present invention, FIG. 3 exemplarily illustrates the non-face-to-face remote work processing system through user interface sharing according to one embodiment of the present invention, FIG. 4 exemplarily illustrates full sharing and partial sharing, FIG. 5 exemplarily illustrates signature data sharing, FIG. 6 exemplarily illustrates image and voice data sharing, FIG. 7 exemplarily illustrates history logging and replay function, and FIG. 8 exemplarily illustrates multiple sharing.

A system and method for processing remote work through user interface sharing according to one embodiment of the present invention may provide a service that enables remote sharing and collaboration of all user interface (UI) blocks implemented on the web.

In the digital transformation and post-pandemic situations, non-face-to-face and remote business is becoming an essential element. Remote service businesses using non-face-to-face technology are becoming a trend in various fields such as finance, healthcare, and education. Therefore, in this embodiment, a user interface is shared to enable remote work processing.

Referring to FIG. 1, a system 1 for processing remote work through user interface sharing according to one embodiment may include a work support server 10, a first user terminal 50, and a second user terminal 60. The work support server 10, the first user terminal 50, and the second user terminal 60 may be connected via a wired or wireless network.

The first user terminal 50 is a terminal device operated by an employee who is a service provider providing a specific service. A computing device equipped with an application or program (hereinafter collectively referred to as an application) related to non-face-to-face remote work processing according to one embodiment or equipped with an operating system that can install through download and execute the application, may be, for example, a smartphone, a tablet PC, a laptop, a desktop PC, and so on. The first user terminal 50 may be a sharing user terminal that shares its own screen.

The second user terminal 60 is a terminal device that is possessed or operated by a customer who is a user receiving a specific service. The second user terminal 60 is also a computing device equipped with an application or program (hereinafter collectively referred to as an application) related to non-face-to-face remote work processing according to one embodiment or equipped with an operating system that can install through download and execute the application, and may be, for example, a smartphone, a tablet PC, a laptop, a desktop PC, and so on. The second user terminal 60 may be a viewer user terminal that shares and displays the screen of the first user.

The work support server 10 is a server device that communicates with the first user terminal 50 and the second user terminal 60, and enables smooth provision of the corresponding service by sharing a user interface between the first user terminal 50 and the second user terminal 60.

The work support server 10 may include a device sharing server 11, a work sharing server 12, a session management server 13, and a push server 14 included in an execution architecture. Additionally, the work support server 10 may further include one or more of a monitoring server 15, a plug-in management server 16, a user account management server 17, and an update server 18 included in the operation architecture.

The device sharing server 11 is configured for managing a list and status of devices connected to a terminal (particularly, first user terminal 50). And the device sharing server 11 is configured for sharing the devices included in the device list so that they can be accessed and used by other terminals (for example, second user terminal 60 or another employee terminal).

The user interface sharing server 12 is configured for managing access data of application users (customers, employees, etc.). And the user interface sharing server 12 is configured for providing a linking function between the server and the application for sharing the user interface between the user terminals (e.g., screen sharing, data sharing, event sharing, annotation function, etc.).

The session management server 13 is configured for managing the authority and authentication for the application user to access an access point gateway (AP Gateway).

The push server 14 is configured for transmitting various messages such as notices and news to the application.

The monitoring server 15 is configured for monitoring and collecting a status of the terminal (first user terminal 50, second user terminal 60) on which the application is running. The monitoring server 15 may be configured for analyzing the collected data to respond to failures and providing information on the terminal status upon request.

The plug-in management server 16 is configured for registering and managing plug-ins linked to the application. The plug-in management server 16 may be configured for providing necessary plug-in information in conjunction with the build process.

The user account management server 17 is configured for managing the accounts of application users (customers, employees, etc.).

The update server 18 is configured for distributing and installing applications, plug-ins, or related files.

Referring to FIG. 2, a block diagram of the terminal (first user terminal 50 or second user terminal 60) equipped an application or on which the application is installed through download is shown.

The terminals 50, 60 may include a communication module 71, a web view module 72, an interface module 73, an update module 74, a monitoring module 75, a sharing module 76, a video/audio module 77, and a device/plug-in management module 78.

The communication module 71 is configured for communicating with the work support server 10 to transmit and receive various data and files. The communication module 71 may include a mobile communication device such as 3G, 4G, or 5G and/or a short-range communication device such as Bluetooth or Wi-Fi. Data and files transmitted and received through the communication module 71 may be encrypted through an encryption module (not shown) to prevent hacking, etc.

The web view module 72 is configured for displaying a screen according to an execution of the application 80.

The interface module 73 may be a native interface, for example, a JavaScript native interface.

The update module 74 is configured for receiving files distributed from the update server 18 through the communication module 71, and updating the applications, plug-ins, or related modules.

The monitoring module 75 is configured for collecting various data and logs about the terminal status when the application is executed, and transmitting them to the monitoring server 15 through the communication module 71.

The video/audio module 77 is configured for supporting video calls or voice calls between employees and customers so that non-face-to-face services can be provided during the service delivery process. In the case of the voice call, the video/audio module 77 may include a microphone and a speaker, and in the case of the video call, the video/audio module 77 may include a camera.

The device/plug-in management module 78 is configured for managing devices and plug-ins linked to the application.

The sharing module 76 may be a user interface sharing module that is configured for providing a user interface sharing function. User interface sharing may include screen sharing, data sharing, history logging and replay, event sharing, annotation functions, and so on. In addition, the sharing module 76 can also provide a device sharing function.

The user interface sharing function, in particular the screen sharing function, can enable remote work processing without face-to-face interaction, by allowing the whole or part of the screen of the first user terminal 50 to be shared and displayed in a designated area of the second user terminal 60 when a connection for work support is established between a plurality of terminals which wish to be connected to each other in a predetermined manner. Alternatively, the sharing user and the viewer user can be switched so that the whole or part of the screen of the second user terminal 60 may be shared and displayed in a designated area of the first user terminal 50, thereby enabling the employee to easily perform or assist the work required by the customer without having to directly handle the second user terminal 60.

The device sharing function is configured for allowing access to a device (e.g., a printer, a card issuing machine, etc.) connected to a specific first user terminal 50 from another terminal (second user terminal 60 or another employee terminal) that is not directly connected to the device, and to perform a work (printing, issuing cards, etc.) via the device.

The non-face-to-face remote work processing system and method through user interface sharing according to one embodiment may be used as follows.

In the process digital environment of the financial sector based on digital transformation, a financial sales staff can collaborate and share tasks such as electronic signatures, product designs, and payment requests between customers and employees in environments such as ODS (Out Door Sales) and Mobile Branch, regardless of the device type. It can also be used in digital kiosks linked to biometric authentication systems without bankbooks or cards.

In the defense sector, when building a ship's combat system where security is essential, it can enable access and control of various hardware such as weapons and sensors, support high security requirements, and support offline execution to ensure normal operation in the event of network disconnection.

In the e-learning sector, it can enable interaction between teachers and students to provide e-learning services by sharing the teacher's learning and lecture content with the remote student's terminal. Collaborative teaching through two-way communication is possible by sharing the electronic board and student terminals, and interactive collaborative teaching between teachers and students can be achieved by using the push function.

Public services in the public sector may enable the sharing of identity verification kiosks at airports/ports or unmanned government vending machines with customer terminal environments, as well as face-to-face/non-face-to-face public sharing services for public institutions.

In a digital twin-based manufacturing environment focused on the manufacturing sector, the digitalization of dynamic simulations of physical objects and systems, user terminal environments for simulating design, operation, and maintenance of production facilities, and virtualization training of field workers can be carried out through collaboration and sharing.

In the digital medical sector, it can be used to build a telemedicine system that supports real-time sharing of biometric information collected through IoT devices, and it can be used to connect between medical devices and EMR (electronic medical record) systems can be used.

In a collaborative software development environment, shared development tools that enable knowledge sharing and real-time code review in a collaborative work, sharing, and horizontal relationship can be supported.

In the call center sector, non-face-to-face support can be provided by using calls and sharing services when requesting help while using an application. Counselors can share the customer's screen through a sharing service to check the content of the inquiry and use a screen guide function to provide guidance. It may be easier and faster than dealing with customers only via phone or messaging.

Referring to FIG. 3, some area 55 of the terminal screen 50 of the sharing user can be set as a shared screen, and the shared screen 65 may be displayed on the screen of network-connected viewer terminal 60. In one embodiment, in addition to such screen sharing, data sharing and event sharing are also possible, and annotation functions can also be provided.

In one embodiment, the user interface sharing may include the following:

Full sharing of web page: A function to share the entire user's web page with other users Partial sharing of web page: A function to share a partial area of the user's web page with other users (see FIG. 3)

Data sharing: A function to transfer data between shared devices, signature data sharing History logging & replay: A function to log and replay the history of actions on a shared screen Multi-party collaboration: A plurality of users can interactively control and update the shared screen Event sharing: A function to share events such as touch/click/input on a shared screen Annotation function: Supporting collaboration through highlighter and/or annotation on a shared screen Referring to FIG. 4, the concept of full sharing and partial sharing is illustrated.

In the case of full sharing, the whole page 52 implemented on the Web is shared 62. The sharing user terminal and the viewer user terminal share the same content. The sharing user and the viewer user may be implemented to have control over the entire shared page.

In the case of partial sharing, only a part of the page 55 implemented on the Web is shared 65. By sharing only some areas, only the contents necessary for security or work can be shared. The sharing user and the viewer user may be implemented to be controlled for some areas that are shared.

Referring to FIG. 5, the concept of signature data transmission is illustrated.

When a handwritten signature is to be obtained from a viewer user at the sharing user terminal 50 processing work, if a partial area (signature area) requiring a handwritten signature is selected, a view for writing a signature is provided on the viewer screen (viewer user terminal screen) and a handwritten signature can be entered using a pen function.

The view for writing a signature may include a pop-up window 67 that runs on the viewer screen for entering a handwritten signature. In the screen shared on the viewer screen by full sharing or partial sharing, the area in which a signature is to be handwritten may be displayed small due to the screen ratio. Therefore, by displaying the pop-up window 67, the viewer user can be made more clearly aware of the area that is currently required to be entered and can enter accurate signature data.

In this way, a signed electronic document can be stored by the real-time signature function in a user interface sharing situation.

Referring to FIG. 6, the concept of transmitting photo and voice data is illustrated.

The viewer user terminal may be a mobile terminal. In this case, the appearance (e.g., face, etc.) of the viewer user can be captured and the image data can be transmitted to the sharing user terminal by linking an image capturing function using the camera provided in the viewer user terminal.

Or, by linking the recording function using the microphone provided in the viewer user terminal, the voice of the viewer user can be acquired and the voice data can be transmitted to the sharing user terminal.

Here, the image data can be used for identity authentication in connection with documents (e.g., contract documents) being created through user interface sharing.

The voice data is data recorded as the contractor's voice reading important phrases in the contract document, and can also be used for identity authentication.

Referring to FIG. 7, the concept of history logging and replay is illustrated.

When the user interface sharing function is used, the history logging and replay functions can be provided. When the sharing user terminal and the viewer user terminal are connected and the user interface sharing function is activated, the history recording related to the sharing processing information (such as the combination of the shared screen and the occurrence event (user actions such as clicks, mouse movements, input, signature, and annotation processing)) can be started and stopped for a specific period of time, that is, a preset period of time, or depending on whether a pre-specified event occurs.

At this time, the user interface sharing server 12 acts as a broker server and stores the history record relating to the sharing processing information in the database.

The history record can be replayed upon request. The replay is a playback of sharing processing information over time from the start of the history recording to the end of the history recording, which can be provided by displaying the shared screen and reproducing the occurrence event.

For example, in a non-face-to-face work where a multi-page contract document needs to be reviewed and signed, a series of steps from the time of input by the sharing user or the viewer user occurs to the time of completion of the final contract document is completed can be recorded as history. These history records can be viewed via replay to verify that the contract was properly executed.

By allowing filter levels, filter targets, and storage periods to be set as options for history records, unrestricted replay and replay by unauthorized parties can be prevented.

In the history recording, the terminal's sharing module 76 may be configured for operating the front camera on at least one of the sharing user terminal and the viewer user terminal to capture the sharing user or viewer user at a random time unknown to the sharing user or viewer user, and to attach the captured image data and the capture time information to the history record as authentication data and to store them together.

This can be accomplished by overlaying or displaying image data captured at the capture time in a separate area on the shared screen that is later played back when replaying the history record, thus confirming the user's identity in that sharing function.

For example, let's assume a situation in which an employee and a customer are signing an insurance contract non-face-to-face through the user interface sharing function. A typical insurance contract requires the employee to share a number of contract-related pages with the customer on the screen and to obtain a handwritten signature from the customer. This series of steps is recorded as the history record through the history logging function, so that it is possible to determine whether the insurance contract has been concluded normally.

In addition, the camera on the customer's device can be used to capture the signer's face at the moment of signing, or at the moment of agreeing to and confirming the signature material, so that it can be verified that the signature was made by someone other than the customer, thereby preventing unfair contracts from being concluded in advance or serving as strong evidence in the event that the legitimacy of the contract is disputed even after the contract has been entered into. In addition, important phrases can be read along, and the recorded voice data can be acquired and attached as authentication data to the history record.

These signature documents, image data, and voice data can be encrypted in their original form and stored and managed in a database.

In addition, FIG. 8 illustrates the concept of a multi-viewer function.

The content shared by a sharing user using a terminal can be shared by a plurality of viewer users using their own terminals.

Some viewer user terminals are provided only in a simple viewer mode, and only a designated viewer user terminal can be set to a collaboration mode with the sharing user terminal, so that functions such as modifying and annotating the shared content can be applied.

Hereinafter, a non-face-to-face remote work processing method performed in a non-face-to-face remote work processing system through user interface sharing according to one embodiment will be described with reference to related drawings. For the convenience of understanding and explanation of the present invention, it is assumed that the screen sharing function among the user interface sharing functions is applied to a financial ODS.

FIG. 9 and FIG. 10 exemplarily illustrate a work support process through screen sharing according to one embodiment of the present invention, FIG. 11 exemplarily illustrates a work screen sharing between a customer terminal and an employee terminal, and FIG. 12 exemplarily illustrates a screen view.

A customer service in a smart branch is illustrated in FIG. 9. It is assumed that the first user terminal 50 is an employee terminal and the second user terminals 61, 62 are customer terminals.

The customer determines whether to have the work processed face-to-face by an employee or by himself or herself when they visit the branch (step S100).

In the case of handling works by oneself, the customer can perform deposit/withdrawal/transfer processing at an ATM (Automated Teller Machine) or directly handle branch office counter work such as issue/reissue of cards, OTP issuance, reissue of bankbooks, and password changes at an STM (Smart Teller Machine, Self Teller Machine) (step S105).

In the case of a customer handling works in person with an employee, it is determined whether a banking application is installed on the first customer terminal 61 (mobile phone, smart phone) (step S110).

If the banking application is installed, the employee terminal 50 and the first customer terminal 61 are linked to handle works through screen/data sharing (step S115).

If the banking application is not installed, the second customer terminal 62 (tablet or PC owned by the bank, provided for the customer to use) provided at the counter and the employee terminal 50 are linked to handle works (step S120).

Here, the first customer terminal 61 and the second customer terminal 62 are terminals on which banking applications are installed, and although they are owned differently by the customer and the bank, they both have in common that they are operated by the customer during the banking process.

Referring to FIG. 10, the process in which the employee terminal 50 and the first customer terminal 61 are linked and process works in step S115 will be described in more detail.

In order to identify the terminal that wants to share the screen and establish a connection, an identification code (e.g., QR code) is first generated and displayed on the employee terminal 50 (step S200).

The first customer terminal 61 uses a camera to capture the identification code displayed on the employee terminal 50, thereby extracting information about the employee terminal 50 to be shared, and a connection is established between the employee terminal 50 and the first customer terminal 61, so that sharing can begin (step S205).

While aforementioned description assumes that the identification code is generated at the employee terminal 50, this is only one embodiment, and it is of course possible to establish the connection by generating the identification code at the first customer terminal 61 and capturing it at the employee terminal 50.

That is, if there are two terminals that wish to establish a connection, an identification code can be generated at any terminal, the generated identification code can be captured at another terminal, and information about the terminal that generated the identification code can be extracted to establish the connection for sharing (screen and/or data) between the two terminals.

If the connection is established, a work screen among the screens of the first customer terminal 61 is shared (step S210). The work screen sharing may be for whole or a predetermined portion (screen area A) of an execution screen of application on the first customer terminal 61.

The shared screen may be displayed at a predetermined location on the employee terminal 50. In FIG. 10, the shared screen (customer screen) may be displayed in section A, and contents for smooth work processing (work area, common area) corresponding to the shared screen contents may be displayed in sections B and C.

Referring to FIG. 11, a case where a work screen is shared between a first customer terminal 61 and an employee terminal 50 is illustrated. The customer screen may be mirrored and displayed in a designated area A of the employee terminal 50.

Thereafter, the first customer terminal 61 can receive customer input by outputting items requiring customer input through the shared screen (step S215). In this case, the items requiring customer input can be minimized so as not to inconvenience the customer.

According to customer input, a receiving work such as card issuance work, OTP issuance work, biometric information registration, etc., and a lending work such as loan application, electronic signature, etc. can be processed.

In addition, a biometric authentication medium using a fingerprint, iris, etc. may be registered by the banking application installed on the first customer terminal 61 so that it may be used as a means of personal authentication at the ATM (or STM) device (step S220). At this time, the first customer terminal 61 does not transmit the biometric authentication information as it is, but only the authentication result is transmitted, so that sensitive personal information can be protected.

In addition, bank devices such as card issuers, card-type OTP issuers, and printers shared at the branch may be connected to employee terminals 50 to process work previously processed at the teller counter (step S225).

While a situation where the customer is a sharing user and the employee is a viewer user and the employee terminal functions as a viewer to share the screen of the customer terminal was mainly described, in the opposite situation where the customer terminal functions as a viewer to share a part of the employee terminal's screen, the sharing user and the viewer user can of course be switched.

In one embodiment, the screen sharing is performed between two different devices for non-face-to-face remote work processing. At this time, the two devices can have displays with different specifications.

Therefore, a screen view using the One Source Multi Use (OSMU) method can be applied, which can enlarge or reduce the same screen according to the resolution of various devices such as smartphones, tablets, and PCs.

Referring to FIG. 12, the shared screen can be enlarged or reduced by a certain ratio to control the same customer screen to be displayed on the PC, tablet, or smartphone.

In this case, in the employee terminal 50 such as shown in FIG. 11, the screen view may be applied to the customer screen and the work area to minimize screen scrolling due to mirroring of the customer screen. For example, when the size of the display device on which the content is to be displayed is reduced, horizontal scrolling and vertical scrolling may occur simultaneously. In this situation, the screen view function capable of changing the screen size to prevent horizontal scrolling can minimize the need for scrolling.

FIG. 13 exemplarily illustrates a user interface sharing process for non-face-to-face remote work processing.

In FIG. 13, a case where an identification code is generated in the first customer terminal 61 is shown.

When the application is executed and a sharing request is input from the customer, the first customer terminal 61 requests the work support server 10 to generate a token for work sharing (step S300). The work support server 10, especially the work sharing server 12, generates and provides a token that can identify the terminal according to the request from the terminal.

The first customer terminal 61 generates an identification code including the token and access data (encrypted URL information including authentication information) included in the response received in response to a token generation request (step S305). The identification code may be, for example, a QR code.

The generated identification code is transmitted to the employee terminal 50 wishing to share (step S310). The identification code may be transmitted by capturing the identification code displayed on the screen of the first customer terminal 61 with the camera of the employee terminal 50 to obtain image data.

The employee terminal 50 transmits a shared screen request including the identification code and logged-in employee information to the work support server 10 (step S315). It is checked whether the employee using the employee terminal 50 has the necessary authority by using the session management server 13 and the user account management server 17.

In addition, information (identification code) required to access the shared screen by the customer may be transmitted to the work sharing server 12 to establish a connection. The work support server 10 compares the token included in the shared screen request of the employee terminal 50 with the token generated in step S300 to verify whether the request is legitimate, and if the two tokens are the same, access to the shared screen is permitted.

Thereafter, the work support server 10 accesses the shared screen among the application screens running on the first customer terminal 61 according to the connection information (step S320), and transmits the shared screen to the employee terminal 50, so that the connection between the first customer terminal 61 and the employee terminal 50 is established, and the screen sharing (which may include data sharing) is performed.

With the screen sharing in place, the device sharing process may additionally continue. The first customer terminal 61 makes the sharing request to the work support server 10 for the remote device (e.g., the card issuer) (step S325). The sharing request may include a token, and the work support server 10 may validate the received token to verify the requesting first customer terminal 61.

If the request is valid, the work support server 10 transmits a control request for the remote device to the employee terminal 50 connected to the remote device (step S330).

The employee terminal 50 may compare the information received via the identification code with the information received from the work support server 10 to verify its validity, and if valid, control the remote device in accordance with the commands included in the control request to perform an action desired by the first customer terminal 61 (step S335).

The above description focuses on screen sharing via a first customer device 61 owned by the customer. Screen sharing may similarly occur on a second customer device 62 owned by the bank. In this case, the second customer terminal 62 may perform customer authentication, for example, by verifying the customer's ID by an employee or using the customer's biometric information (vein, fingerprint, etc.) registered with the bank in order for the customer to log in, and then allow the customer to share the screen in order to perform the desired work.

In addition, as described above, in other embodiments, the identification code may be generated and output from an employee terminal instead of a customer terminal, and the identification code may be captured by the customer terminal to establish a connection.

FIG. 14 exemplarily illustrates an architecture of a multi-platform application development system according to one embodiment of the present invention.

As described above, a multi-platform application may be an application configured for performing work support through a user interface sharing between two devices running on different platforms.

Referring to FIG. 14, each component of the work support server 10 may be included in an execution architecture (device sharing server 11, user interface sharing server 12, session management server 13, push server 14, etc.) and an operation architecture (monitoring server 15, plug-in management server 16, user account management server 17, update server 18, etc.).

In addition, a build distribution master server 30 may be included in the development architecture. The build distribution master server 30 is configured for managing and controlling a build node 31 and a distribution node 32 that perform the build and distribution process of the application provided to developers and service operators.

The build node 31 is configured for providing a service that generates an executable file that can be run on Android, IOS, Windows, Linux, and Kiosk platforms.

The distribution node 32 is configured for distributing the application to stores provided by the platform, such as the App Store, Play Store, and Microsoft Store.

The above-described method for non-face-to-face remote work processing through user interface sharing may also be implemented in the form of a non-transitory recording medium including instructions executable by a computer, such as an application or program module executed by a computer. Non-transitory computer-readable medium can be any available media that can be accessed by a computer and includes both volatile and nonvolatile medium, removable and non-removable media. In addition, non-transitory computer-readable medium may include computer storage medium. Computer storage medium includes both volatile and nonvolatile, removable and non-removable media implemented in any method or technology for storage of information such as computer readable instructions, data structures, program modules or other data.

The above-described method for non-face-to-face remote work processing through user interface sharing may be executed by an application (which may include a program included in a platform or operating system by default installed in the terminal) installed by default in the terminal, and by an application (i.e., program) that a user manually installed in the terminal after downloading from an application store server, or an application providing server such as a web server related to the application or service. In this sense, the above-described method for non-face-to-face remote work processing through user interface sharing may be implemented as an application (i.e., program) installed by default in the terminal or manually installed by a user, and may be recorded in the non-transitory computer-readable recording medium such as the terminal.

While the invention has been described above with reference to exemplary embodiments, it will be understood by those skilled in the art that the invention can be modified and changed in various forms without departing from the concept and scope of the invention described in the appended claims.

What is claimed is:

1. A system for non-face-to-face remote work processing through user interface sharing, comprising:
   a first user terminal on which a service application is installed and executed;
   a second user terminal configured for sharing and displaying a user interface in accordance with execution of the service application; and
   a work support server, in communication with the first user terminal and the second user terminal, and configured for, under specified conditions, facilitating the user interface of the first user terminal to be shared with the second user terminal to enable remote and non-face-to-face work processing,
   wherein at least one of the first user terminal and the second user terminal comprises a user interface sharing module configured for performing a history logging regarding user interface sharing,
   wherein the user interface sharing module is configured for recording a history record relating to sharing processing information between the first user terminal and the second user terminal over a period of time, so that the history is stored in a database,
   wherein the sharing processing information is a combination of occurrence events regarding shared screen and user actions,
   wherein the user interface sharing module provides a replay function that, upon request, is configured for retrieving the history stored in the database to display the shared screen and replaying the events that occurred,
   wherein the user interface sharing module is configured for activating, randomly in time and without awareness of a sharing user or a viewer user, a front camera installed on at least one of the first user terminal and the second user terminal during the history logging to capture an image data and a time information, so that the image data and the time information of the sharing user or the viewer user are attached to the history record as authentication materials and kept together, and wherein the image data captured at a capture time is overlayed or displayed in a separate area of the shared screen.

2. The system of claim 1, wherein the occurrence event comprises at least one of click, mouse movement, input, signature, and annotation processing.

3. The system of claim 1, wherein the user interface sharing module is configured for activating a microphone installed on the terminal during history logging to record a voice of the shared user or the viewer user and attach voice data to the history record as an authentication material and kept together.

4. The system of claim 1, wherein the work support server is configured for generating a token corresponding to a token generation request for user interface sharing from one of the first user terminal and the second user terminal and transmitting the token to the requesting terminal, and determining whether the token included in a sharing request from the other of the first user terminal and the second user terminal is the same as the token sent to either of the first user terminal and the second user terminal to determine whether the sharing is authorized.

5. The system of claim 4, wherein at least one of the first user terminal and the second user terminal is configured for generating and displaying on a screen an identification code having the token and access information to the work support server, and the other of the first user terminal and the second user terminal is configured for generating the sharing request using data captured by the identification code.

6. A method for non-face-to-face remote work processing through user interface sharing, comprising:
   initiating a user interface sharing between a first user terminal and a second user terminal;
   logging a history of a shared screen and occurrence events at a user interface sharing module included at least one of the first user terminal and the second user terminal when a predetermined condition is met;
   storing a history record in a database at the user interface sharing module; and
   in response to a replay request for the history record, retrieving the history record from the database at the user interface sharing module to display the shared screen and reproduce the occurrence event sequentially,
   wherein, in the logging a history, a front camera installed on at least one of the first user terminal and the second user terminal is activated, randomly in time and without awareness of a sharing user or a viewer user, during the history logging to capture an image data and a time information, so that the image data and the time information of the sharing user or the viewer user are attached to the history record as authentication materials and kept together, and wherein the image data captured at a capture time is overlayed or displayed in a separate area of the shared screen.

7. The method of claim 6, wherein, in the logging a history, a microphone installed on the terminal is activated during history logging to record a voice of the shared user or the viewer user and attach voice data is attached to the history record as an authentication material and kept together.

* * * * *